Aug. 10, 1926. 1,595,465
D. E. HARDING
AUTOMATIC MARKING DEVICE AND RESET FOR MEASURING MACHINES
Filed May 1, 1924 3 Sheets-Sheet 1
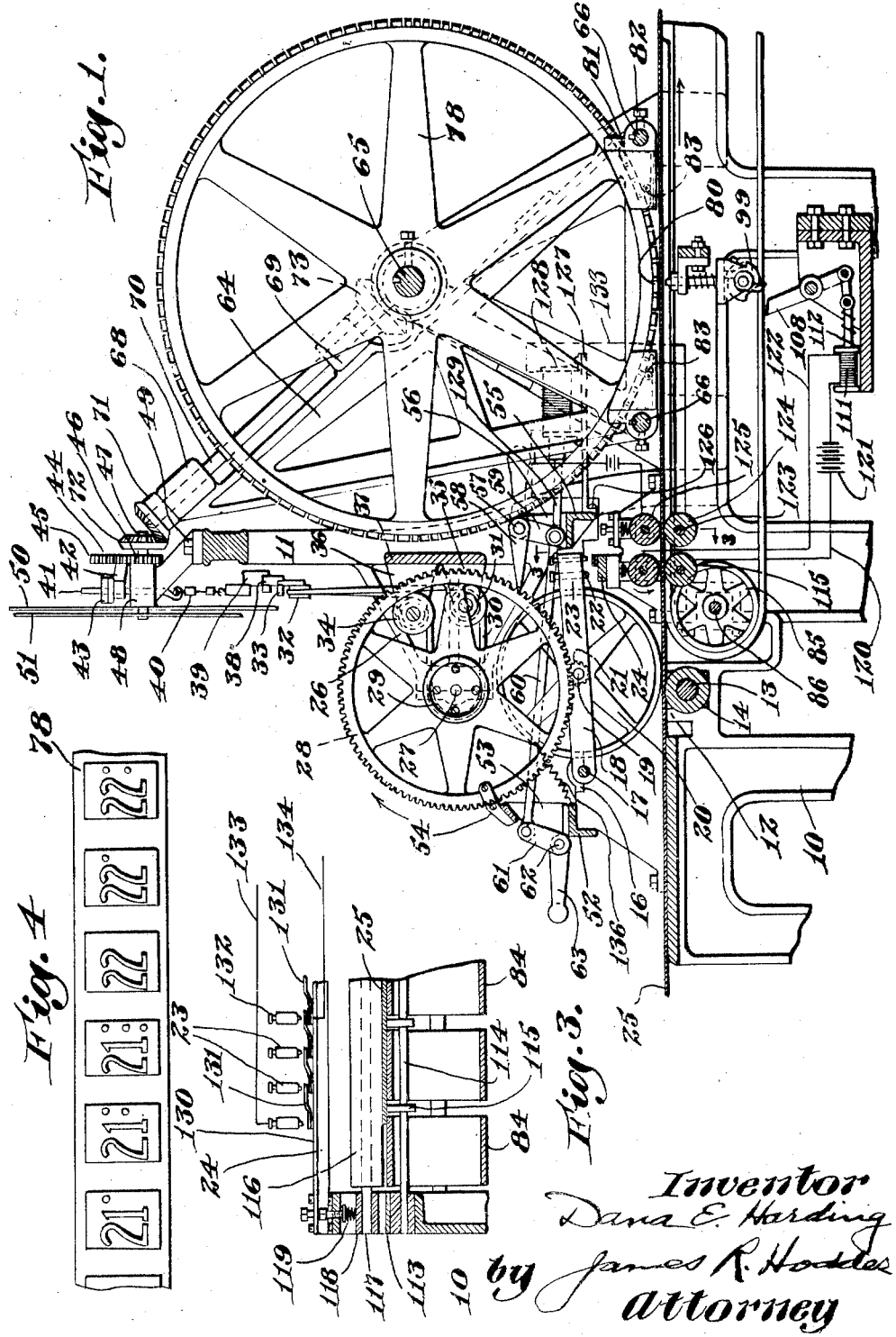
Inventor
Dana E. Harding
by James R. Hodges
Attorney Aug. 10, 1926.
D. E. HARDING
1,595,465
AUTOMATIC MARKING DEVICE AND RESET FOR MEASURING MACHINES
Filed May 1, 1924 3 Sheets-Sheet 2
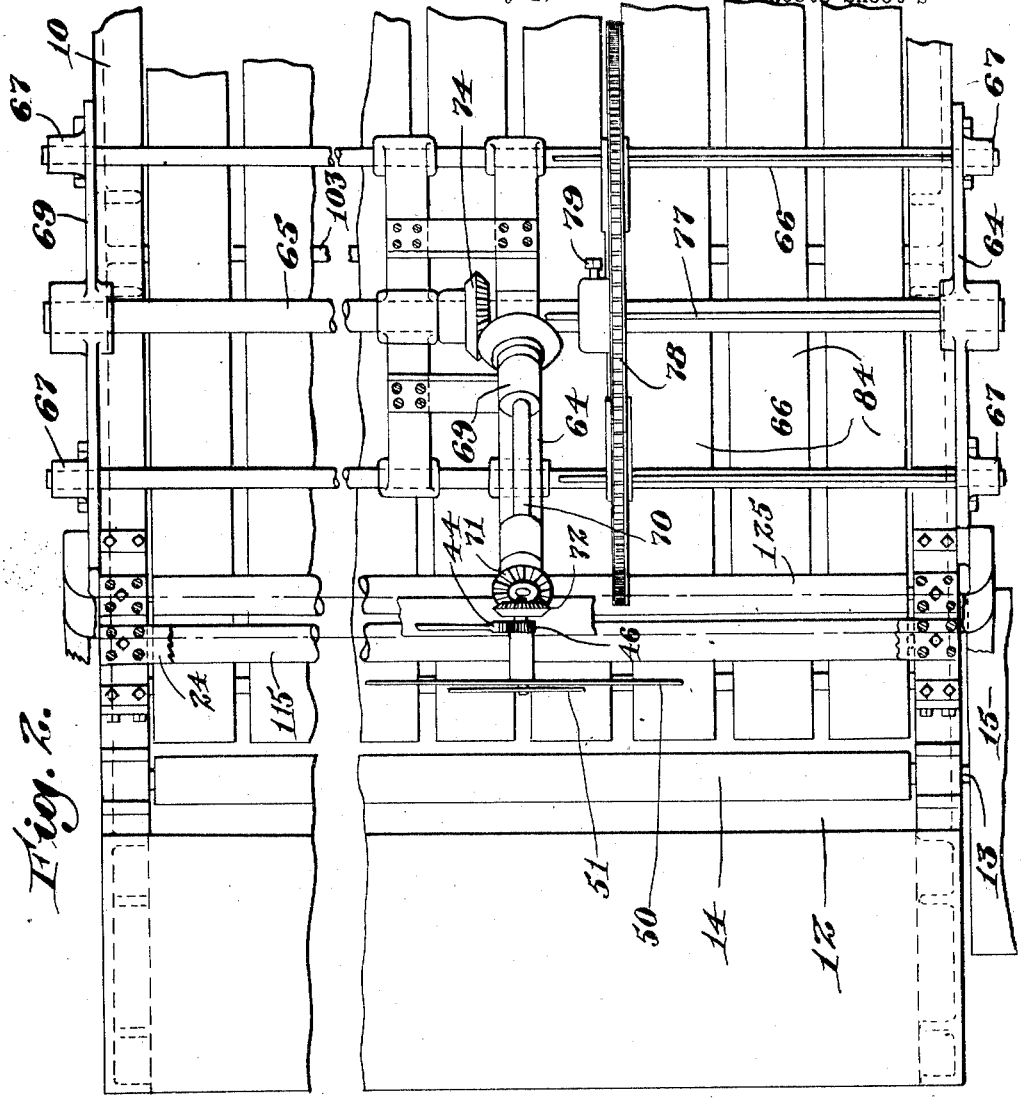
Inventor
Dana E. Harding
by James R. Hooker
Attorney Aug. 10, 1926.
D. E. HARDING
1,595,465
AUTOMATIC MARKING DEVICE AND RESET FOR MEASURING MACHINES
Filed May 1, 1924 3 Sheets-Sheet 3
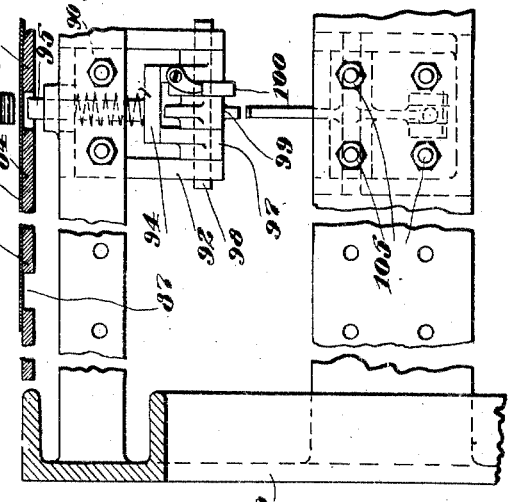
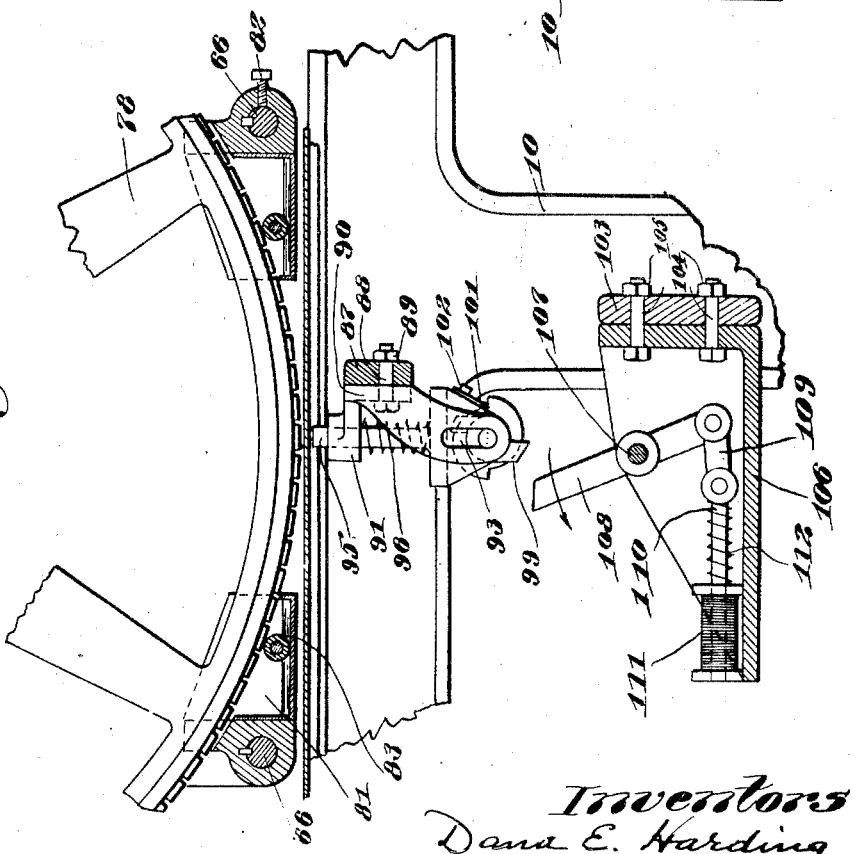
Inventors
Dana E. Harding
by James R. Hodder
Attorney Patented Aug. 10, 1926.

1,595,465

UNITED STATES PATENT OFFICE.

DANA E. HARDING, OF ARLINGTON, MASSACHUSETTS, ASSIGNOR TO HARDING ENGINEERING COMPANY, OF EAST BOSTON, MASSACHUSETTS, A CORPORATION OF MASSACHUSETTS.

AUTOMATIC MARKING DEVICE AND RESET FOR MEASURING MACHINES.

Application filed May 1, 1924. Serial No. 710,298.

My present invention relates to leather working machinery, and more particularly to leather measuring machines and appliances therefor.

Leather measuring machines as at present constructed consist essentially of a plurality of parallelly arranged freely rotatable wheels and under which the leather to be measured passes, being driven under such measuring wheels by a continually rotating bed roll. Each of the measuring rolls is independently movable in a vertical plane and the shaft on which such rolls are mounted has secured thereto a pinion which may be either continually in mesh or intermittently brought into mesh with a gear wheel of relatively large diameter. The gears of relatively large diameter are equal in number to the number of measuring wheels and on the hub of each wheel is secured one end of a cord or chain. The end of the cord or chain attached to the hub of one gear wheel passes over idler pulleys and around a pulley rotatably mounted in bearings on a beam, thence downwardly around idler pulleys and the other end of such cord or chain is attached to the hub adjacent to the gear wheel. The gear wheels are also arranged in groups with as many pairs of wheels associated with a beam as may be desired. The beams are also arranged in groups and are attached to other beams which are arranged in groups, but smaller than the first said groups and finally the groups of beams are attached to a single beam which, in turn, is attached to a lever that is secured to a pivotally mounted beam. On the end of the pivotally mounted beam is secured a quandrant provided with gear teeth that mesh with the teeth of a pinion secured to a shaft of an indicating device. Also secured to the shaft of the indicating device is an indicating hand or pointer that is associated with a graduated scale to indicate the amount of surface of a sheet of leather or other material that passes under the measuring rolls. The above is the usual form of measuring device and is the measuring device to which my present invention has been applied. In the above form of measuring device or machine, and in all other forms of measuring machines, it is necessary to re-set the device after each measuring operation and this has heretofore been performed manually. Heretofore, also no means has been available for indicating or marking on the hide or other material the superficial area of such sheet as measured by the machine and it is necessary, therefore, for an operative to perform this useful and necessary operation by hand.

In my development of this art, and particularly in connection with automatic hide feeding apparatus, there is provided means for smoothing out a hide or other relatively thin material as the same is fed automatically from a pile or stack. This hide feeding apparatus is adapted for use particularly in connection with a measuring machine and it is my intention to utilize such hide feeding apparatus in connection with a measuring or weighing machine or other instrumentality on which a specific operation is performed on, particularly, leather. In order to utilize to the full all the benefits of an automatic hide feeding apparatus such as is referred to above, it is desirable from an economic standpoint that means to be associated with, or provided in a measuring machine for not only resetting the measuring machine to zero after each hide measuring operation but to also automatically stamp on such measured hide the superficial area as indicated by the pointer and graduated scale of the machine. The addition of such device makes it possible to not only dispense with the extra employee heretofore necessary for stamping the weight on the hides when such hides are called off to him by the operator of the machine, but also, except under special conditions, to dispense with the services of an operator so that a leather measuring machine may be made practically automatic in character and a single operator may take care efficiently of a hide feeding and leather measuring machine and a single operator, therefore, may efficiently perform the duties of what was heretofore performed by a minimum of four men.

In carrying out my invention, I associate with the operating mechanism of a measuring machine a device which, when the hide has passed through the machine and has its superficial area accurately determined, will automatically stamp on such hide the superficial area as indicated by the indicating mechanism of the machine and will also reset such indicating mechanism to zero preparatory to performing a similar operation on a succeeding hide.

One of the principal objects of my invention, therefore, is an improved automatic leather measuring machine.

Another object of my invention is an improved reset device for a measuring machine.

A further object of my invention is an improved automatic stamping device for accurately stamping on a hide the superficial area thereof as determined by the measuring machine.

Other objects and novel features of the construction and arrangement of parts will appear as the description of the invention progresses.

In the accompanying drawings illustrating the preferred embodiment of my invention as applied to a measuring machine, Fig. 1 is a side elevation, partly in section;

Fig. 2 is a plan of the machine shown in Fig. 1;

Fig. 3 is a front sectional elevation on the line 3—3 of Fig. 1;

Fig. 4 is a development of a portion of the surface of the stamping roll;

Fig. 5 is an enlarged sectional side elevation of the lower right hand portion of Fig. 1, and Fig. 6 is a rear elevation of the lower portion of Fig. 5.

The measuring machine to which my invention has been applied may be of the usual and well known type and, therefore, only so much of such machine is shown as is necessary for an understanding of my invention.

In the accompanying drawings, therefore, 10 designates the bed or standard of a leather measuring machine to the upper surface of which is secured a framework 11. The upper face or table portion of the base 10 is cut away at 12 and to the side members of the base 10 are formed bearings in which is rotatably mounted a shaft 13. Secured to the shaft 13 is a bed roll 14, a plane passing through the upper surface of this roll lying slightly above the upper surface of the base 10. Secured to one end of the shaft 13 is a pulley 15 over which may pass a belt from any suitable source of power to rotate the bed roll 14 in the direction of the arrow shown in Fig. 1. Above the base 10 and on each side of the members thereof are formed bearing clamps 16 and lying in such bearing clamps and extending transversely of the machine above the top of the base 10 is a shaft 17. Referring to Fig. 1, it will be noted that, on the shaft 17, is rotatably mounted a bar 18 and this bar forms a side plate of a frame which has, intermediate its ends, rotatably mounted a shaft 19. Secured to the shaft 19 so as to be rotatable therewith is a measuring wheel 20 and a pinion 21. The weight of the frame 18 is sufficient to cause a downward movement of the measuring wheel 20 which, therefore, would come into engagement with the bed roll 14 were it not prevented by some means. This means is an adjusting screw 22 which passes through the enlargement 23 on the rear end of the frame 18 and the lower end of this adjusting screw engages with the cross bar 24 extending between the side members of the framework 11 and thus limits the downward movement of the measuring wheel 20. This adjustment of the measuring wheel is such that the measuring wheel 20 will never come into direct engagement with the bed roll 14, but will be driven by such bed roll through the medium of a skin or hide 25 as the same is passed between the bed roll 14 and measuring wheel 20. While in Fig. 1 and the drawings but one frame 18 and measuring wheel 20 are shown, it is to be understood that there are a plurality of measuring wheels 20 arranged parallel with each other.

On the side members of the framework 11 and extending forwardly thereof are subframe members 26 in which is secured a shaft 27 which lies parallel with the shaft 17 and the various shafts 19 of the plurality of measuring wheels 20 and on this shaft 27 are rotatably mounted a plurality of indicating gear wheels 28 which are adapted to mesh with their respective pinions 21 of the measuring wheels 20 when the frames 18 are in their upper position because of the interposition of a sheet of leather 25 between the measuring wheels 20 and bed roll 14. Each of the indicating gear wheels 28 is provided with a hub 29 and, considering two adjacent indicating gear wheels 28, the hub of one of such gear wheels has secured thereto one end of a rope or chain 30 which passes under a rotatably mounted pulley 31 over a pulley 32 on a beam 33, thence downward and under a rotatably mounted pulley 34. The pulleys 31 and 34 are rotatably mounted in forwardly extending bearing blocks 35 and 36 respectively, each of these bearing blocks being formed integral with a web 37 that extends between, and is formed integral with, the uprights of the frame member 11. There are a plurality of these forwardly extending bearing blocks 35 and 36 arranged parallel to each other and located one of each of these blocks between adjacent indicating gear wheels 28. The structure above described is the usual measuring machine and in such measuring machine there are, of course, a plurality of pulleys 32 arranged on the beam 33, which beam is, in turn, pivotally mounted to a second beam 38 and it is to be understood that there are a plurality of such beams 38, though less in number than the number of beams 33. The beam 38 is, in turn, pivotally mounted to a beam 39 of which there is but one in the machine. At the middle point of the beam 39 is pivotally attached the lower end of a chain, rope, or other instrumentality 40 to the upper end of which is secured a threaded member 41 and which threaded member passes through a hole through one end of a member 42 and screwing onto the member 41 is a thumb nut 43 and by means of which the relative position of the member 41 with respect to the member 42 may be adjusted. The end of the member 42 remote from the adjusting screw 41 is secured to a pivoted beam 44 on one end of which is formed a segmental gear 45. This segmental gear 45 meshes with, and drives, a pinion 46 secured to a shaft 47 that is rotatably mounted in a bearing member 48 secured to the top of the frame member 11 by bolts 49. To the front end of the bearing member 49 is secured, against movement, a dial plate 50 and the shaft 47 protrudes through such dial plate. Secured to the outer end of the shaft 47 is an indicating hand or pointer 51 which cooperates with graduations marked on the face of the dial plate 50. Secured to the lower front ends of the side members of the frame 11 and extending transversely between such side members is an angle plate 52 and to the top of this angle plate is secured a stop block 53, the upper edge of which is bevelled, as shown, to engage with stops 54 attached to the indicating gear wheels 28. These stops 54 are attached to the indicating gear wheels 28 at such a point that the indicating hand 51 registers with the zero indication on the graduated dial plate 50 and this represents the normal or initial position of the device. Secured to the frame member 11 between the side uprights thereof is an angle member 55 on the top surface of which is formed or secured in any desired manner and at each end thereof a bearing block 56. Rotatably mounted in the bearing block 56 is a shaft 57 and secured to such shaft 57 are a plurality of locking pawls 58, there being one locking pawl for each of the indicating gear wheels 28. Secured to the shaft 57 intermediate the ends thereof, and preferably substantially midway between the uprights of the frame member 11 or with respect to the plurality of parallelly arranged indicating gear wheels 28, is a crank arm 59 to the lower end of which is pivotally attached the rear end of a connecting rod 60. The connecting rod 60 is pivotally attached at its front end to a link 61. This link 61 is secured to a shaft 62 that is rotatably mounted in a bearing secured to the top surface of the angular member 52 and also secured to the shaft 62 is an operating arm 63. With the structure just described arranged as shown in Fig. 1 it will be obvious that, if the indicating gear wheel 28 is rotated in the direction of the arrow shown, rotation in a contrary direction will be prevented by the engagement of the locking pawl 58 with the gear teeth on each gear wheel so that, after the indicating gear wheel 28 has moved to a point determined by the rotation of the measuring wheel 20, it will remain locked in this position and the movement imparted to the indicating hand 51 by such rotative movement of the gear wheel 28 will be indicated on the graduations on the dial plate 50. The operator, in throwing the device back to its zero position, will lift up on the operating handle 63, throwing the crank arm 59 in such manner as to depress the engaging portion of the locking pawl to thereby release the indicating gear wheel 28 and the beam 44 is so arranged as to rotate the shaft 47 and allow the indicating gear wheels 28 to rotate in the proper direction until the stop 54 comes into engagement with the stop block 53.

Secured to the top surface of the base 10 and arranged on either side thereof are frame members 64 and aligned bearings in such members have rotatably mounted therein a shaft 65. Secured in the side frame 64 parallel to, but spaced apart from, each other and slightly above the upper surface of the base 10 are splined shafts 66, these splined shafts being secured at their ends in bearings or brackets 67 formed on the side members 64. The shafts 66 are secured in the bearings or brackets 67 against rotation. Formed integral with the cross bar of the frame member 11 and extending upwardly and rearwardly therefrom is a bearing bracket 68. Formed integral with, and extending rearwardly and upwardly, from the cross member 37 is a bearing bracket 69. Bearings are formed in each of the bearing brackets 68 and 69 in alignment with each other and in these bearings is rotatably mounted a shaft 70. Screwed to the upper end of the shaft 70 and rotatable therewith is a bevel gear 71 which meshes with, and is driven by, a bevel gear 72 secured to the shaft 47 rearward of the pinion 46. To the lower end of the shaft 70 is secured a bevel gear 73 which meshes with, and drives, a bevel gear 74 that is secured to the rotatably mounted shaft 65. One end of the shaft 65 is splined, as shown at 77, and slidably mounted on the splined end of the shaft 65, but rotatable therewith, is a marking wheel 78, the hub of such wheel being provided with a set screw 79 and by means of which the marking wheel may be adjustably secured on the shaft 65. The marking wheel 78 is provided on its periphery with a plurality of numerals that correspond with the graduated divisions on the dial plate 50; that is, referring to Fig. 5, it will be noted that a development of a portion of the circumference of the marking wheel 78 is shown and shows the numerals 21′, 21″, 21‴, 22, 22′, 22″, and these numerals correspond to the graduations 21¼, 21½, 21¾, 22, 22¼, 22½, respectively on the graduated dial plate 50. The train of gearing 72, 71, 73, 74 is so proportioned that the angular rotation of the shaft 47 is equal to the angular rotation of the shaft 65. Referring now to Fig. 1, the indicating hand 51 in its vertical position corresponds with the zero indication on the dial plate 50 while the zero indication or numeral on the marking wheel 78 is located at the lowermost point or the point indicated by the numeral 80. The numerals on the periphery of the marking wheel 78 are raised and are to be used to mark on a skin or hide the superficial area in such hide and this marking is to be done with ink or other marking fluid. To provide for inking the numerals on such marking wheel 78, I have provided on the splined shafts 66 ink reservoirs 81 which are adjustably secured on such splined shafts 66 by the set screws 82. Rotatably mounted in the reservoirs 81 so as to be continually in engagement with the periphery of the numerals thereon are inking rollers 83.

The sheet of leather or other material 25 is fed through the machine from front to rear, after passing the bed roll 14 and measuring wheel 20, by a plurality of belts or conveyors 84, these belts being arranged parallel to each other, as shown in Fig. 3, and at their front end are supported on a plurality of spaced parallelly arranged pulleys 85 rotatably mounted on a shaft 86 that is secured at its outer ends in suitable bearings in the base 10. These conveyor belts 84 are driven at the desired rate of speed by any suitable means and from any suitable source of power, the particular arrangement of this conveyor belt forming, however, no part of my present invention. Such conveyor belts have their top reach moving in the direction of the arrow shown in Fig. 1. Immediately below the lowermost figure designated by the numeral 80 in Fig. 1 and secured to, or formed integral with, the frame 10 is a cross bar 87. Secured to the cross bar 87 by bolts and nuts 88 and 89 respectively is a member 90 having formed at its top a forwardly and upwardly extending lug 91 provided with a vertically arranged perforation. The member 90 has also formed integral therewith and on each side thereof forwardly and downwardly extending side plates 92 and in each of these side plates are vertically arranged slots 93 in alignment with each other. Rotatably mounted in the slots 93 is a shaft 98, and secured to the shaft is a member 97. Formed integral with the member 97 and on the top side thereof is a member that has secured to, or formed integral therewith, an upwardly extending shaft 95 that is a sliding fit in the vertically arranged perforation in the lug 91. Surrounding the shaft 95 and bearing between the under side of the lug 91 and the upper face of the member 94 is a coil spring 96 which tends to force the member 94, and therefore the shaft 98, downwardly toward the bottom of the slots 93. The upper end of the shaft 95 acts as a platen for forcing the sheet of leather or other material 25 upwardly into engagement with the numerals on the periphery of the wheel 78 and it will be noted that the shaft 95 is moved upward between adjacent conveyor belts 84. Secured to the shaft 98 between the bearing lugs 97 is a cam member 99 and also secured to the shaft 98 adjacent to the cam member 99 is a ratchet 100. A spring pawl 101 secured to one of the members 97 by means of screw 102 acts to prevent anticlockwise rotation of the shaft 98 while permitting a clockwise rotation of such shaft. Secured to, or formed integral with, the side members of the base 10 and extending therebetween is a frame member 103. Secured to the member 103 by bolts 104 and nuts 105 respectively and beneath the cam member 99 is a member 106. Rotatably mounted in the member 106 on a horizontal shaft 107 is a cam lever 108 to the lower end of which is pivotally attached one end of a link 109. The other or forward end of this link 109 is pivotally attached to the rear end of a plunger armature 110 which lies within the magnetic field generated in the solenoid 111. A coil spring 112 surrounding the plunger armature 110 and abutting against the head of the solenoid 111 and the head of the plunger armature 110 tends to force the said plunger armature to the rear of the machine or to the right, as viewed in Fig. 5, so as to rotate the cam lever 108 in the direction of the arrow indicated on such figure.

On each of the side members of the base 10 and extending upwardly from the upper edge or surface thereof are bearing members 113. In suitable bearings in such members 113 below the upper level of the base 10 and slightly to the rear of a vertical plane passing through the shaft 86 is rotatably mounted a shaft 114. Secured to said shaft at intervals along the length thereof so as to be located between adjacent conveyor belts 84 are contact wheels 115. These contact wheels 115 extend slightly above the upper reach of the conveyor belts 84. Immediately above the contact wheels 115 is a contact roll 116 secured to a shaft 117 that is rotatably mounted in suitable bearings 118 slidably mounted for vertical movement in the bearing standards 113. A coil spring located between the upper end of the bearing 118 and the under surface of the top of such bearing member or standard 113 tends to force the shaft 117 and therefore the roll 116 downward and into engagement with the contact wheels 115. The contact wheels and roll 116 are electrically insulated from each other and, as indicated in the drawings, the contact wheels 115, or the shaft 114, are connected by conductor 120 to a source of current 121 which, in turn, is connected to one end of the solenoid coil 111. The other end of the solenoid coil 111 is connected by conductor 122 to the roll 116 or shaft 117. It will be obvious, therefore, that, when a sheet of leather or other material 25 is being fed through the machine from left to right, as viewed in Fig. 1, that when such material passes between the contact wheels 115 and roll 116, the circuit through the solenoid coil 111 will be broken and the solenoid coil, therefore, de-energized, allowing the spring 112 to move the upper end of the cam lever 108 to the left, as viewed in Fig. 1 and out of engagement with the cam member 99. When the sheet of leather or other material 25 has passed beyond or between the contact wheels 115 and roll 116, such contact wheels and roll will come into engagement with each other, completing the circuit from battery 121 to the solenoid coil 111 which thereupon attracts the plunger armature 110, causing the upper end of the cam lever 108 to move to the right, as viewed in Fig. 1, and such cam lever, striking the cam 99, causes a smart upward movement of the shaft 95 and passing that portion of the sheet of leather or other material 25 immediately above the shaft 95 into engagement with the inked numerals that happen to be in position indicated by the numeral 80 in Fig. 1 and such numerals will cause an imprint to be made on the sheet of leather.

Immediately below the upper level of the base 10 and to the rear of the shaft 114, but parallel thereto, is a shaft 123 that is rotatably mounted in suitable bearings in the side members of the base 10. Secured to said shaft at intervals along the length thereof are contact wheels 124 similar in size and function to the contact wheels 115 above described. Immediately above the contact wheels 124 and normally in engagement therewith is a roll 125. Secured to the cross bar 55 by rivets 126 or in any other suitable manner is a bracket plate 127 to which is secured a solenoid 128, the plunger armature 129 of which is pivotally attached to the rear end of the connecting rod 60 and the lower end of the link 59. Secured to the top of the bearing members 113 and extending across the machine is the plate 24 and to the top of this plate is secured a plate of insulating material 130. Secured to the top of the insulating plate 130 is a plurality of springs 131 of conducting material, there being one of such springs for each of the arms 18. Screwing through the end 23 of each of the arms 18 is an adjusting screw 132, the lower end of which engages with one end of the springs 131 and forces such end downwardly and into engagement with one end of the next succeeding spring, as clearly shown in Fig. 4. The springs 131 act as devices for creating a number of break points in an electric circuit. One end of the contact springs 131 is connected by conductor 133 with one end of the solenoid coil 128. The other end of the contact springs 131 is connected by conductor 134 to the roller 125. The contact wheels 124, or the shaft 123 thereof, is connected to one pole of a battery 135, the other end of this battery being connected to the other end of the solenoid coil 128. The solenoid coil 128 with its plunger armature 129 acts as an electrically operable means for moving the locking pawl 57 into and out of locking position with respect to the measuring gear wheel 28. Secured to the cross bar 52 is one end of a spring 136, the other end of this spring being secured to the connecting rod 60 and this spring acts to move the connecting rod 60, and therefore the plunger armature 129, toward the front of the machine, or to the left as viewed in Fig. 1, and therefore to move the locking pawl 58 into operative position with regard to the indicating gear wheel 28.

The operation of my improved machine is as follows, it being assumed that it is desired to measure the superficial area of a sheet of leather or other material of irregular shape and contour, automatically stamp on the skin or other material the amount of such superficial area and then re-set the indicating machine ready to initiate another operation. Normally the ends 23 of the arms 18 are in their downward position with the set screw 22 engaging with the cross bar 24, the bed roll 14 is rotating in the direction of the arrow shown in Fig. 1 and the upper reaches of the conveyor belts 84 are moving in the direction of the arrow associated therewith in Fig. 1. The end 23 of the arms 18 being in the downward position, the pinions 21 are out of engagement with their respective indicating gear wheels 28. If, now, a hide or skin of leather or other material is fed into the machine and between the bed roll 14 and measuring gear wheels 28, the measuring gear wheels will be moved upward, bringing the pinions 21 into engagement with the indicating gear wheels 28 which will therefore revolve in the direction of the arrow shown associated therewith. The amount of this rotation will be transmitted by the levers 33, 38, and 39 to the arm 42 and the pointer 51 will move over the graduated dial plate 50 to indicate the superficial area of the sheet of leather or other material as the same passes between the bed roll 14 and the measuring wheels 20. Having passed beyond the bed roll 14 and measuring gear wheels 28, the front end of the sheet of leather or other material will pass between the contact wheels 115 and the roll 116. These are therefore separated from each other and the circuit through the solenoid 111 is broken, allowing the spring 112 to move the upper end of the cam lever 108 to the left, as viewed in Fig. 1. As the sheet of leather or other material 25 passes through the wheels 115 and roll 116, the forward end thereof will pass between the wheels 124 and roll 125, acting in this manner to provide another break point in the energizing circuit for the solenoid 128, it being understood at this point that, as the end 23 of the various levers 18 was lifted upwardly by the sheet of leather 25, a plurality of break points in the energizing circuit for the solenoid 128 were provided by the separation of the various contact springs 131. The marking wheel 78 being geared to the shaft 117 so as to move in synchronism therewith, the indications of such marking wheel 78 will be moved successively into position at the point indicated by the numeral 80 simultaneously with the movement of the indicating hand 51 into corresponding position on the dial plate 50. When the rear end of the sheet of leather has passed entirely beyond the bed roll 14 and measuring wheels 20, the end 23 of the various arms 18 will move downwardly, bringing the contact screw 22 into engagement with its associated contact springs 131 and this movement of the contact springs 131 will close the plurality of break points in the energizing circuit for the solenoid 128. No circuit will, however, be completed through the solenoid 128 at this time because of the fact that the wheels 124 and roll 125 are still maintained out of engagement with each other by the sheet of leather. It will be understood that, during the passage of the sheet of leather between the bed roll 14 and measuring gear wheels 28, the locking pawl 58 is in operative position with the indicating gear wheel 28 so as to allow such wheels to rotate in a clockwise, but prevent rotation thereof in an anti-clockwise, direction, this construction preventing a retrograde movement of the indicating hand 51 over the dial plate 50 and when the pinions 21 have been moved out of engagement with their respective measuring gear wheels 28, the individual measuring gear wheels 28 will be locked in position pending the release of the locking pawl 58. The entire superficial area of the sheet of leather or other material 25 having been measured and the measurement held by the locking pawls 58, the hide in its onward movement will pass beyond the wheels 115 and roll 116 which therefore are brought into engagement with each other completing, in this manner, the energizing circuit for the solenoid 111. This energization of the solenoid causes an attraction of the plunger armature 112 and the rearward movement, or movement to the right as viewed in Fig. 1 of the upper end of the cam lever 108 which cam lever, engaging with the cam 99, forces the vertically arranged shaft upward, bringing the surface of the leather into engagement with the inked numeral in the position indicated by the numeral 80, thus actually printing such numeral on the surface of the sheet of leather or other material. The measuring and marking operation having been completed, it is only necessary to re-set the measuring machine to its normal or neutral position and, as the sheet of leather or other material moves onward beyond the wheels 124 and roll 125, such wheels and roll will come into engagement with each other, completing the final break point in the energizing circuit from battery 135 for the solenoid 128. The energization of the solenoid 128 causes an attraction of the plunger armature 129 and the movement to the right, as viewed in Fig. 1, of the connecting rod 60 which rotates the shaft 57 and moves the locking pawl 58 downward in the direction of the arrow shown in Fig. 1 and out of engagement with the measuring gear wheels 28 which thereupon return to their zero position, the various measuring gear wheels 28 rotating in an anti-clockwise direction until the stops 54 thereon engage with the stop bar 53. This sequence of operations may be repeated indefinitely.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, means cooperating with the marking wheel for marking on the skin or hide the superficial area thereof as indicated on the dial, and electrically operated means controlling the operation of the marking means operable only when the superficial area of the skin or hide has been measured.

2. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, a vertically movable plunger cooperating with the wheel for marking on the skin or hide the superficial area thereof as indicated on the dial, a cam secured to, and movable with, said plunger, a cam lever cooperating with the cam for moving said plunger upward toward said marking wheel, and means for operating said cam lever.

3. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, a vertically movable plunger cooperating with the wheel for marking on the skin or hide the superficial area thereof as indicated on the dial, a cam secured to, and movable with, said plunger, a rotatably mounted cam lever for moving said plunger upwardly toward the marking wheel, and an electrically operated means for controlling the movement of said cam lever.

4. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, a vertically movable plunger cooperating with the wheel for marking on the skin or hide the superficial area thereof as indicated on the dial, a cam secured to, and movable with, said plunger, a rotatably mounted cam lever for moving said plunger upwardly toward the marking wheel, a plunger armature connected to said cam lever, a solenoid for controlling the movement of said plunger armature, an energizing circuit for said solenoid, and means controlled by the passage of a skin or hide through the machine for completing the circuit for said solenoid.

5. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, a vertically movable plunger cooperating with the wheel for marking on the skin or hide the superficial area thereof as indicated on the dial, a cam secured to, and movable with, said plunger, a rotatably mounted cam lever for moving said plunger upwardly toward the marking wheel, a plunger armature connected to said cam lever, a solenoid for controlling the movement of said plunger armature, an energizing circuit for said solenoid, and means mounted on the machine in the rear of the measuring devices for completing the circuit for the solenoid only after a skin or hide has passed through the measuring devices.

6. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, a vertically movable plunger cooperating with the wheel for marking on the skin or hide the superficial area thereof as indicated on the dial, a cam secured to, and movable with, said plunger, a rotatably mounted cam lever for moving said plunger upwardly toward the marking wheel, a plunger armature connected to said cam lever, a solenoid for controlling the movement of said plunger armature, an energizing circuit for said solenoid, and a pair of rolls mounted on the machine in the rear of the measuring devices and connected in the energizing circuit for the solenoid, said rolls being normally held apart during the passage of a skin or hide through the machine and whereby the energizing circuit for the solenoid is completed only after a skin or hide has passed through the measuring devices.

7. In a leather measuring machine provided with measuring wheels, a graduated dial and an indicating pointer cooperating with said dial for indicating the superficial area of a skin or hide as the same passes through the machine of a rotatable marking wheel, means for moving the marking wheel in synchronism with the movements of the pointer, means for supplying marking material to the periphery of the wheel during the rotation thereof, and means cooperating with said marking wheel for marking on the hide the superficial area as indicated on the dial.

8. In an improved leather measuring machine for measuring the superficial area of skins or hides comprising a base, a bed roll rotatably mounted in said base transversely of the machine and having its upper edge extending slightly above the upper surface of the base, a shaft mounted above the base and lying parallel with the bed roll, a plurality of arms rotatably mounted on said transverse shaft, a measuring wheel rotatably mounted in each of said arms, a pinion associated with each of said measuring wheels, a plurality of measuring gears parallelly arranged with respect to each other and mounted above, and normally out of engagement with, the pinions, a dial plate, a rotatably mounted indicating hand cooperating therewith, connections from said hand to the plurality of measuring gear wheels for totaling the amount of rotary movement of said gear wheels, said pivotally mounted arms movable upward by a skin or hide passing between the bed roll and the measuring wheels for moving the pinions into mesh with the measuring gear wheels, means associated with said measuring gear wheels for permitting rotary movement of the measuring gear wheels in one direction only whereby the total of the superficial area of a hide or skin is held indicated on the dial by the pointer after the skin or hide has passed through the machine, and means for automatically resetting the measuring gear wheels.

In testimony whereof, I have signed my name to this specification.

DANA E. HARDING.